May 14, 1957
J. L. KINNEE
2,792,134
ATTACHMENT FOR POWER LIFT TRUCK
Filed July 14, 1954
2 Sheets-Sheet 2
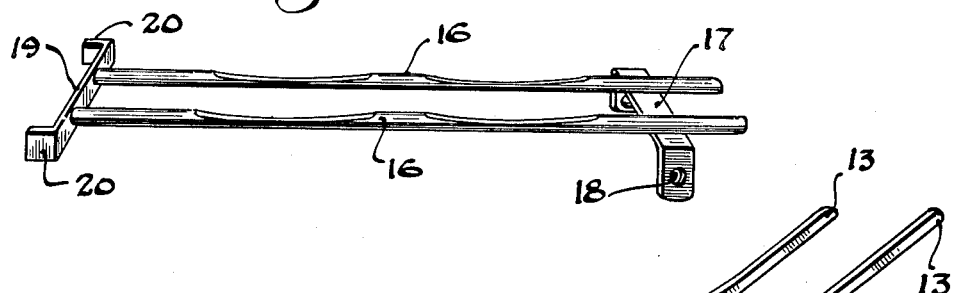
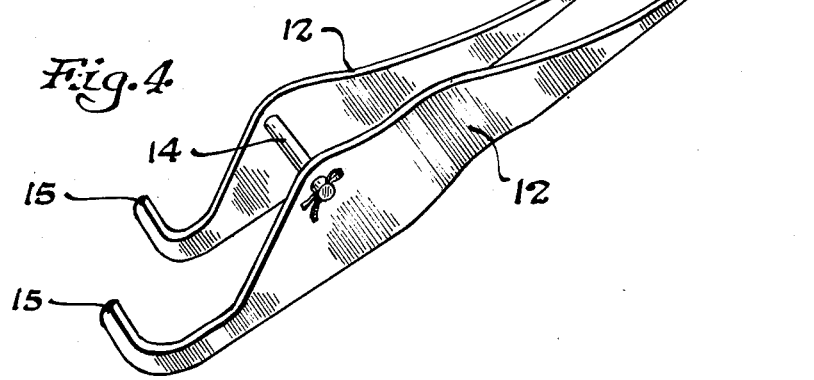
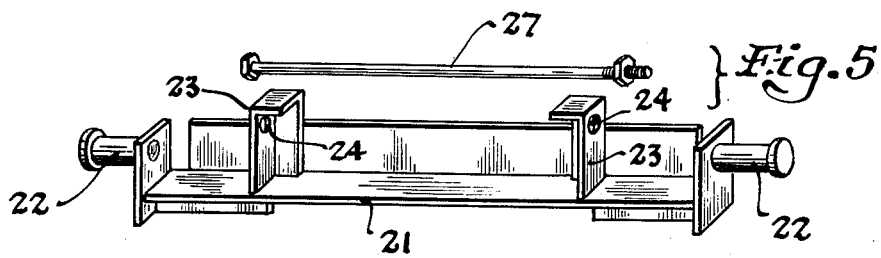
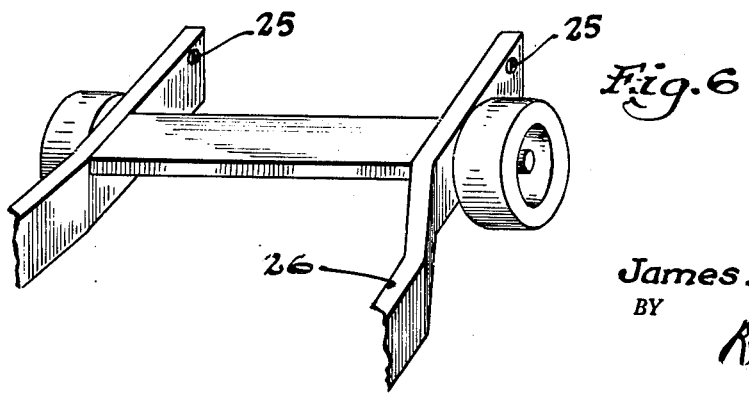
INVENTOR.
James L. Kinnee
BY
ATTORNEY

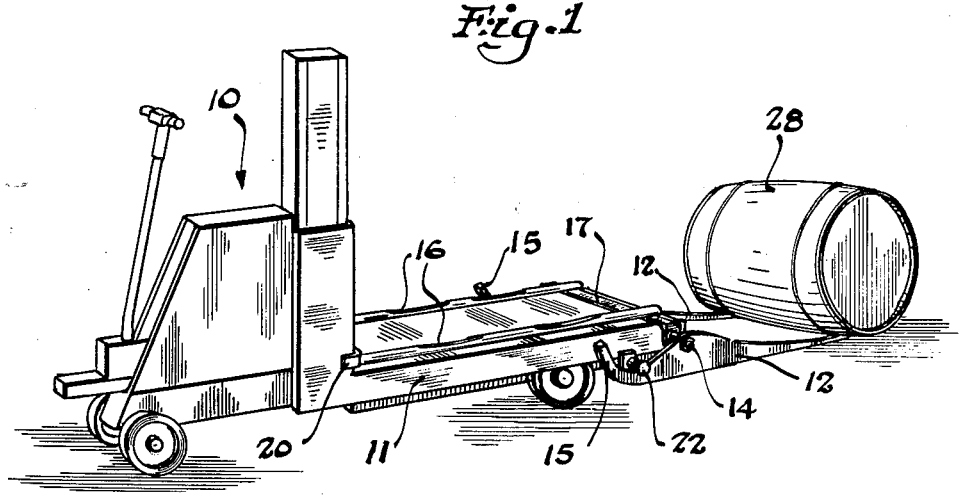
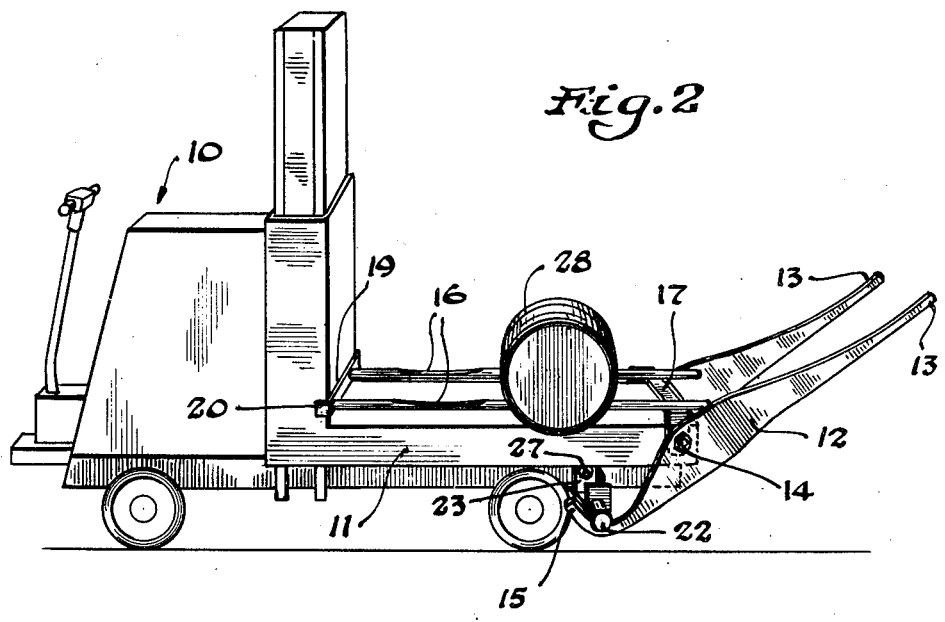

United States Patent Office

2,792,134

ATTACHMENT FOR POWER LIFT TRUCK

James L. Kinnee, Milwaukee, Wis., assignor to Swift & Company, Chicago, Ill., a corporation of Illinois Application July 14, 1954, Serial No. 443,239

3 Claims. (Cl. 214—77)

This invention relates generally to a material handling device. More particularly, the invention relates to an attachment for industrial or vertically movable platform trucks especially adapted for loading and unloading barrels or tierces or similarly shaped objects.

Various devices have been suggested as aids in loading and unloading industrial trucks, such as scoops and gripping devices. Barrels or tierces, however, because of their shape and weight present a peculiar problem. The attachments which have been used to facilitate their handling have either required specially built trucks or, in the case of gripping devices, have made impossible the full use of the truck's carrying capacity as they are capable of gripping only a single object at a time.

It is therefore an object of this invention to provide a device which may be readily attached to a conventional industrial truck to facilitate handling of containers and other objects of the barrel or tierce type.

Another object of this invention is to provide a material handling attachment through the use of which the entire platform of an industrial truck may be readily loaded with barrels or tierces.

A further object of this invention is to provide a material handling device of the aforementioned nature which may be readily detached from an industrial truck when it is desired to use the truck for purposes other than moving barrels and tierces.

Other objects and advantages of this invention, if not specifically set out, will become apparent to one skilled in the art during the course of the following description.

Broadly, the present invention comprises a plurality of pivotally mounted fork members, having tines so tapered at their leading ends as to readily slip beneath barrels, tierces or similarly shaped articles when the latter are rested horizontally upon a flat surcase. On the ends of the fork members opposite the tines, hook-like members are provided which are adapted to coact with fixedly mounted rollers or similarly shaped extensions so as to form cams. The device, together with an accompanying frame, is mounted upon an industrial truck platform with the aforementioned hooks engaging the fixedly mounted rollers. On raising the truck platform, the tips of the tine-like extensions describe an arc due to the presence of the pivots at their midpoints and to the fact that the cams prevent the hooked ends of the pivoted members from moving upwardly. A complete understanding of the device and its operation may be gained by reference to the following description and accompanying drawings.

In the drawings:

Figure 1 is a side view in perspective showing a truck with longitudinally mounted tierce supporting rails and pivoted fork members. In this view the truck platform is in its lowermost position.

Figure 2 is a side view in perspective similar to that of Figure 1, but with the truck platform partially raised so as to urge the tines upwardly.

Figure 3 is a side view in perspective showing the tierce guide frame or supporting rails.

Figure 4 is a side perspective view of lever fork members which mount on the front end of an industrial truck platform.

Figure 5 is also a view in perspective showing a cam roller support frame or bracket suitable for mounting on a truck undercarriage.

Figure 6 is a perspective view showing the forward end of a conventional platform-truck undercarriage.

Referring now to the drawings in which like characters refer to like parts throughout; the apparatus and supporting means comprise an industrial truck 10 of the type having a horizontally extending platform 11 capable of being elevated and lowered by means of a chain drive or similar mechanism. In Figure 1, the platform and tines are shown in their lowermost positions, that is, positions suitable for the initial step in the operation of lifting barrels or tierces onto the truck platform. In Figure 2, the platform is raised somewhat. Further details of the structure and operation of the industrial truck are omitted here as these constitute no part of the instant invention. Suffice it to say that any industrial truck having a vertically movable platform or apron is suitable.

The apparatus itself comprises lever forks 12, the forward ends of which form elongated tines 13 which narrow rapidly and are preferably slightly concave on the upper surfaces so as to aid in retaining objects having curved surfaces, such as barrels or tierces. The lever forks are rigidly constructed and are further provided with uppermost surfaces of such a shape that they will readily serve as rails on which barrels or tierces may easily roll. When mounted on the truck, the tines are connected in substantially parallel fashion by means of a rod 14. The opposite or trailing ends of fork members 12 are provided with perpendicularly mounted hook-like extensions 15.

Also mounted on the truck is a tierce guide frame, separately shown in Figure 3. This has two laterally spaced tubes or rails 16 which may be mounted longitudinally of the truck platform. Preferably, these tubes are slightly indented at one or two places along the length thereof. This aids in retaining barrels or tierces in proper position while additional containers are being loaded or unloaded. At the forward end of the laterally spaced rails or tubes, a cross member 17 is welded, bolted, or otherwise suitably secured in perpendicular fashion. This cross member is provided with downwardly extending flanges, each of which have holes 18 drilled in the center thereof. The holes are about equal in size to others drilled on either side of the truck platform and are so positioned that, when the frame is placed upon the platform surface, the two sets may be readily brought into registration with one another. At the rearward end of the guide frame, a second perpendicularly mounted member 19 is provided having flanges 20 which extend either downwardly so as to grip the truck platform or, as shown in the figures, extend backwardly whereby to engage the vertically extending portion of the truck frame or platform.

The cam roller supporting member 21, shown separately in Figure 5, is provided with cam rollers 22 at either end thereof. Means are provided for fixedly attaching this supporting member to the undercarriage of an industrial truck. Rigidly constructed upright brackets 23 having holes 24 suitably spaced for registration with corresponding holes 25 of a power truck undercarriage 26 are shown. A rod 27 or bolts secure the cam roller support in position on the forward end of the truck undercarriage. It is to be noted that this member should that the truck platform can be adjusted to its lowermost position without encountering any obstruction. In Figure 5, it is seen that a space is provided between the upright flanges on which the rollers themselves are mounted and the remainder of the supporting member.

When it is desired to attach the above described apparatus to a truck platform, the cam roller support 21 is mounted on the forward end of the truck undercarriage 26 and secured thereto by means of rod 27. The tierce guide frame is fitted upon the truck platform in such a fashion that member 19 having perpendicular flanges 20 grips the upright portion of the truck platform or, alternatively, its horizontal portion. This is shown in Figures 1 and 2. The member 17 with the downwardly extending flanges grips the forward end of truck platform and thereby aids in securely holding the entire frame in position. The fork members 12 are mounted in parallel fashion on either side of the platform by means of shaft or rod 14 which passes through holes 18 as well as corresponding holes in the truck platform itself. Of course, ordinary bolts can easily serve the function of this rod providing a pivot point or fulcrum for the fork members 12. The hooks 15 engage the cam rollers 22 and are thereby prevented from moving upwardly to any great extent regardless of how much the platform itself is raised.

When the truck is to be used to lift and move barrel-shaped objects, the platform is lowered to the point at which the tines 13 rest squarely on the floor surface. A barrel or tierce resting upon its bilge allows entry of forks on both ends when the truck is moved in a backward direction so as to bring the tines beneath both ends (see Figure 1). The truck platform is then raised until it is in about the position shown in Figure 2. Cam rollers 22 resist upward movement on the part of the hook members 15 thereby rapidly elevating the tines 13. The barrel or tierce then rolls down upon the truck platform by gravity and rests upon laterally spaced rails 16. If the small indentations in the rails previously mentioned are provided, the barrel will remain in position with no tendency to roll from one end of the platform to the other after coming to rest. The process may then be repeated until the entire platform is properly loaded. Additionally, the tines themselves may be used to support and carry a single barrel or tierce when the truck platform proper is already fully loaded. Unloading may be readily accomplished by simply lowering the truck platform and allowing the tines to serve as inclined tracks down which the containers may be readily rolled.

While the instant device is particularly adapted for use on industrial trucks, it is apparent that it may be used with other types of trucks equipped with horizontal platforms which can be manually or mechanically elevated. In such an event, it may be desirable to provide means for readily disengaging hooks 12 from cam rollers 23 so as to permit the platform greater latitude of motion. Also, it is conceivable that the apparatus could be adapted for use in loading freight elevators. It is seen, therefore, that to be within the scope of this invention, it is only necessary that the pivotally mounted members be operated by the simple raising and lowering of a platform and by the use of this or a similar type cam. Advantageously, as suggested above, the frame and pivoted fork are not permanently affixed to a truck platform. This facilitates disengaging the device when the truck is to be used in moving articles which are not of a barrel shape. However, if a truck is to be used exclusively in barrel handling, the frame and attached fork may be bolted or riveted in place. Alternatively, the frame may be dispensed with and the pivoted fork members trunnioned to the platform itself. Finally, the cam support bracket may be simplified by the substitution of a simple bar-like member having U-shaped portions at either end thereof, so as to provide clearance for the platform, or the cam rollers themselves may be directly attached to the truck undercarriage individually.

Obviously, many modifications and variations of the invention as hereinbefore set forth may be made without departing from the spirit and scope thereof, and therefore only such limitations should be imposed as are indicated in the appended claims.

I claim:

1. A loading and unloading device for tierces and barrels comprising: a load supporting means mounted in lever fashion at the fulcrum to the platform of an industrial truck, the power end of said load supporting means being held in position by an assembly secured to the undercarriage of the truck and the fulcrum of the load supporting means being forced upwardly when the platform is raised by hoisting power causing the resistance end of said load supporting means to be elevated, whereby said tierces and barrels are loaded and by reversing the mechanical action are unloaded.

2. A loading and unloading device for tierces and barrels comprising: a set of two forks mounted in lever fashion at the fulcrum to the platform of an industrial truck, the power ends of said forks consisting of upwardly extending hook members adapted to cooperate with and be held substantially in position by rollers mounted on a rigid assembly secured to the undercarriage of the truck and the fulcrum of the forks being forced upwardly when the platform is raised by hoisting power causing the resistance ends of the forks to be elevated whereby said tierces and barrels are loaded and by reversing the mechanical action are unloaded.

3. A loading and unloading device for tierces and barrels comprising: a set of two forks mounted in lever fashion at the fulcrum to the platform of an industrial truck, the power ends of said forks consisting of upwardly extending hook members adapted to cooperate with and be held substantially in position by rollers mounted on a rigid assembly secured to the undercarriage of the truck and the fulcrum of the forks being forced upwardly when the platform is raised by hoisting power causing the resistance ends of the forks to be elevated whereby said tierces and barrels are loaded and by reversing the mechanical action are unloaded, and a plurality of rails seated upon said truck platform and disposed longitudinally thereof, said rails having indentations to retain tierces and barrels in position thereon.

References Cited in the file of this patent

UNITED STATES PATENTS

| | | |
|---|---|---|
| 768,808 | Krumpelmann | Aug. 30, 1904 |
| 1,155,336 | Buckwalter | Oct. 5, 1915 |
| 1,768,149 | Remde | June 24, 1930 |
| 2,506,242 | Shoemaker | May 2, 1950 |
| 2,508,507 | Fowler | May 23, 1950 |
| 2,569,609 | House et al. | Oct. 2, 1951 |
| 2,680,529 | Narvestad et al. | June 8, 1954 |
| 2,683,539 | Corley | July 13, 1954 |
| 2,713,431 | Koehler | July 19, 1955 |
| 2,756,886 | Schaffer | July 31, 1956 |

FOREIGN PATENTS

| | | |
|---|---|---|
| 348,249 | Germany | Feb. 4, 1922 |
| 571,580 | France | Feb. 6, 1924 |
| 108,256 | Sweden | Aug. 17, 1943 |